(12) United States Patent
Yoneda et al.

(10) Patent No.: US 6,900,148 B2
(45) Date of Patent: May 31, 2005

(54) LEATHER-LIKE SHEET MATERIAL

(75) Inventors: Hisao Yoneda, Okayama (JP); Yoshiki Nobuto, Okayama (JP); Kohei Hayashi, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 119 days.

(21) Appl. No.: 10/186,627

(22) Filed: Jul. 2, 2002

(65) Prior Publication Data

US 2003/0022575 A1 Jan. 30, 2003

(30) Foreign Application Priority Data

Jul. 2, 2001 (JP) ........................................ 2001-200318

(51) Int. Cl.⁷ ............................................... D04H 13/00
(52) U.S. Cl. ....................... 442/341; 442/347; 442/363; 428/903; 428/904
(58) Field of Search ................................ 428/904, 903; 442/340, 341, 347, 361, 362, 363

(56) References Cited

U.S. PATENT DOCUMENTS

| | | | |
|---|---|---|---|
| 5,503,899 A | 4/1996 | Ashida et al. | |
| 5,876,466 A | 3/1999 | Nakashima et al. | |
| 6,159,581 A | 12/2000 | Yoneda et al. | |
| 6,322,851 B1 | 11/2001 | Adachi et al. | |
| 6,451,404 B1 * | 9/2002 | Nobuto et al. | 428/91 |
| 6,479,153 B1 | 11/2002 | Kato et al. | |
| 6,517,938 B1 | 2/2003 | Andoh et al. | |
| 6,641,619 B1 | 11/2003 | Nobuto et al. | |
| 6,733,859 B2 | 5/2004 | Nobuto et al. | |
| 6,739,076 B2 | 5/2004 | Yoneda et al. | |

FOREIGN PATENT DOCUMENTS

| | | |
|---|---|---|
| EP | 1 067 234 | 1/2001 |
| JP | 48011925 | 4/1973 |
| JP | 60043476 | 9/1985 |
| JP | 62007309 | 2/1987 |
| JP | 63054832 | 10/1988 |
| JP | 11269774 | 10/1999 |

OTHER PUBLICATIONS

U.S. Appl. No. 10/514,239, filed Nov. 22, 2004, Yoneda et al.
U.S. Appl. No. 10/399,402, filed Apr. 22, 2003, Yasuda et al.
U.S. Appl. No. 10/484,807, filed Jan 30, 2004, Yamasaki et al.

* cited by examiner

Primary Examiner—Terrel Morris
Assistant Examiner—Arden B. Sperty
(74) Attorney, Agent, or Firm—Oblon, Spivak, McClelland, Maier & Neustadt, P.C.

(57) ABSTRACT

A leather-like sheet material comprising a substrate layer composed of an entangled nonwoven fabric consisting of ultrafine fibers and an elastic polymer or elastomer filled therein and having, on one side (side A) of the substrate layer, a grain layer comprising an elastomer mainly consisting of a polyurethane, wherein the ultrafine fibers (a) constituting the side A of the substrate layer have a mean fineness substantially within the range of 0.01 to 0.5 decitex and the ultrafine fibers (b) substantially constituting the other side (side B) opposite to the side A of the substrate layer have a mean fineness of not more than ½ of the mean fineness of the ultrafine fibers (a).

25 Claims, No Drawings

LEATHER-LIKE SHEET MATERIAL

BACKGROUND OF THE INVENTION

1. Field of the Invention

This invention provides a leather-like sheet material giving a feel of inclination in the direction of thickness, being soft but not so stretchy in the transverse direction, and having high peel strength, namely a leather-like sheet material having natural leather-like feelings as well as high mechanical properties rendering the same usable in making sports shoes.

2. Description of the Prior Art

For producing entangled bodies resulting from two or more webs or sheets made of different fibers and laid one over the other, followed by entanglement, and for producing leather-like sheet materials by impregnating them with a polymer elastomer, followed by coagulation, the following technologies are known in the art. Japanese Patent Publication JP Kokoku S48 (1973)-11925 describes a method of producing artificial leathers having, on one surface side, a nap consisting of ultrafine fiber bundles different form those constituting the nap on the other side, which method comprises laying two different fiber webs one over the other, impregnating the nonwoven fabric obtained after needle punching with a polymer elastomer and coagulating the elastomer. Japanese Patent Publication JP Kokoku S60 (1985)-43476 describes a method of producing suede-like sheet materials which comprises laying a flock composed of ultrafine fibers, 0.5 decitex or finer, on a substrate or ground fabric made of a woven or nonwoven fabric and causing a high-pressure liquid flow to spout against the resulting laminate from the flock side for entanglement and integration.

Japanese Patent Publication JP Kokoku S62(1987)-7309 describes a method which comprises laying a web made of ultrafine fibers spun by the melt blown method and a web made of short fibers of another kind one on the other, entangling the resulting laminate by means of a high-velocity liquid flow and filling the entanglement product with a polymer elastomer.

Japanese Patent Publication JP Kokoku S63(1988)-54832 describes a suede-like artificial leather comprising a structure consisting of ultrafine nonwoven fabric layers and a knitted fabric sandwiched between both nonwoven fabric layers, and a rubber-like elastomer distributed in the interspaces of that structure, wherein both nonwoven fabric layers differ in constituent fiber species and the fibers of both layers are intermingled with each other in the vicinity of the knitted fabric but substantially not intermingled with each other in the surface layer portions.

Laid-open Japanese Patent Application JP Kokai H11 (1999)-269774 proposes a structure structurally closer to natural leathers which is a laminate comprising fiber species differing in fineness and has a face on the finer fineness side.

Although leather-like sheet materials closer to natural leathers in which finer fibers are used on the grain side and thicker fibers on the opposite side, like the structure of natural leathers, have thus been proposed, leather-like sheet materials to be used in making shoes, in particular sports shoes, are required to have the feel and touch of natural leathers, be soft and resistant to transverse stretching in the state of shoes and show high peel strength in the bonded part between the instep and sole. However, no such leather-like sheet materials are yet available.

SUMMARY OF THE INVENTION

It is an object of the present invention to provide a leather-like sheet material which is high in peel strength and resistant to transverse stretching, gives a feel of inclination in the direction of thickness and a sense of substantiality and thus is similar in feel and touch to natural leathers and which is, therefore, useful in making sports shoes, in particular. The expression "feel of inclination" as used herein means the feel and touch which suggest a slight difference in substantiality between the front and reverse sides when a leather-like sheet material is taken hold of so as to be gripped between fingers in the direction of thickness. Thus, the feel includes, for example, the feeling experienced upon grasping a natural leather differing in structure from the material according to the invention but having a density gradient from dense to less dense in the direction of thickness from the front to the reverse side.

The present invention provides a leather-like sheet material comprising a substrate layer composed of an entangled nonwoven fabric consisting of ultrafine fibers and an elastic polymer or elastomer filled therein and having, on one side (side A) of the substrate layer, a grain layer comprising an elastomer mainly consisting of a polyurethane, wherein the ultrafine fibers (a) constituting the side A of the substrate layer have a mean fineness substantially within the range of 0.01 to 0.5 decitex and the ultrafine fibers (b) substantially constituting the other side (side B) opposite to the side A of the substrate layer have a mean fineness of not more than ½ of the mean fineness of the ultrafine fibers (a). As a result, the leather-like sheet material gives a sense of inclination in the direction of thickness, is soft and resistant to transverse stretching and has high peel strength, hence have a natural leather-like feel or touch.

DETAILED DESCRIPTION OF THE PREFERRED EMBODIMENT

In the following, the invention is described in detail.

First, the ultrafine fibers so referred to herein are fibers obtained by modifying the shape of multi-component fibers consisting of at least two spinnable polymer species differing in some chemical or physical properties by removing at least one polymer species by extraction at an appropriate step before or after impregnation with an elastomer. The multi-component fibers for generating the ultrafine fibers are ultrafine fiber-generating fibers and typical examples thereof are sea-island type fibers.

The polymer constituting the island component of the ultrafine fiber-generating fibers comprises at least one polymer selected from the class of melt-spinnable polymers including nylons such as nylon 6, nylon 66, nylon 610 and nylon 12, other spinnable polyamides, spinnable polyesters such as polyethylene terephthalate and copolymers mainly comprising the same, polypropylene terephthalate and copolymers mainly comprising the same, polybutylene terephthalate and copolymers mainly comprising the same, other aliphatic polyesters and copolymers thereof, and polyolefins, typically polyethylene, polypropylene and polybutylene, among others. The polymer constituting the sea component comprises at least one polymer differing in solubility in a solvent or in decomposability by a decomposing agent from the island component and low in compatibility with the island component and showing, under spinning conditions, a melt viscosity lower than the melt viscosity of the island component or a lower surface tension as compared with the island component. Thus, it comprises at least one polymer selected from such polymers as polyethylene, polypropylene, polystyrene, ethylene-propylene copolymers, ethylene-vinyl acetate copolymers, styrene-ethylene copolymers, and styrene-acrylic copolymers, for instance.

The proportion of the ultrafine fiber component in the ultrafine fiber-generating fibers is preferably 40 to 80% by weight from the viewpoint of spinning stability and/or economy. This range for the proportion of the ultrafine fiber component in the ultrafine fiber-generating fibers includes all specific values and subranges therebetween, such as 45%, 50%, 55%, 60%, 65%, 70% and 75% by weight. The ultrafine fiber-generating fibers are made up into fibers with a fineness of 2 to 20 deniers in the conventional manner through such treatment steps as stretching, crimping, thermal fixation, cutting and opening. This range for the ultrafine fiber-generating fibers includes all specific values and subranges therebetween, such as 4, 6, 8, 10, 12, 14, 16, and 18 deniers. In the practice of the present invention, at least two ultrafine fiber-generating fiber species differing in fineness are used, and the ultrafine fibers (a) generated from the ultrafine fiber-generating fibers (a') to constitute the side on which a grain face is to be provided are required to have a single fiber fineness of 0.01 to 0.5 decitex. This range for the single fiber fineness includes all specific values and subranges therebetween, such as 0.05, 0.1, 0.15, 0.2, 0.25, 0.3, 0.35, 0.4 and 0.45 decitex. When the fibers (a) are thicker than 0.5 decitex, a remarkable uneven pattern tends to appear on the grain side due to the influence of the thick fibers in the step of pulling up and toward the inside with the grained surface as the front in shoemaking. When the single fiber fineness is less than 0.01 decitex, the peel strength of the grain side tends to decrease.

As for the ultrafine fibers (b) generated from the ultrafine fiber-generating fibers (b') and lesser in fineness than the ultrafine fibers (a), the fineness can be adjusted according to the desired feel and touch and/or for the purpose of preventing stretching in the transverse direction. As the fibers become finer, the surface area of the fibers increases and the interfiber resistance increases, whereby the stretching preventing effect is enhanced. It is necessary that the decitex ratio (b)/(a) between the ultrafine fibers (a) and ultrafine fibers (b) be not more than ½. When the decitex ratio is higher than ½, it is difficult to obtain the desired stretch prevention and feel of inclination. When the decitex ratio is excessively low, a sense of incongruity arises with respect to the balance in feel and touch. Thus, a preferred range is ½ to 1/1000, more preferably ⅕ to 1/100. This range for the decitex ratio includes all specific values and subranges therebetween, such as 1/50, 1/150, 1/200, 1/300, 1/400, 1/500, 1/600, 1/700, 1/800 and 1/900.

The ultrafine fiber-generating fibers (a') and (b') are then respectively opened on a card and formed into random webs or cross-lapped webs (Wa) and (Wb) by passing through a webber, and the webs are laid one on the other to a desired weight and thickness.

The ratio between (Wa) and (Wb) in lamination can be selected arbitrarily according to the intended use of the final product but preferably it is within the range of 20/80 to 80/20 as expressed in terms of fiber weight ratio in the product. This range for the ratio between (Wa) and (Wb) includes all specific values and subranges therebetween, such as 30/70, 40/60, 50/50, 60/40 and 70/30. Outside this range, the product becomes one-sided and the desired feel of inclination in the direction of thickness can hardly be obtained.

In a preferred mode of embodiment of the invention, scraps formed in the step of cutting after lamination or the like mixed web composed of (Wa) and (Wb) may partly be recovered and formed into a web (Wc), if necessary (for example when the amount recovered is very small) in admixture with a portion of the ultrafine fiber-generating fibers (a') and/or (b'), for insertion of this web between the web (Wa) and web (Wb). In a typical example, the laminated web is continuously cut at the edges in a predetermined proportion for width adjustment, for instance, prior to needle punching, and the scraps are recovered and again passed through a webber in admixture with a portion of the ultrafine fiber-generating fibers (b') or (a') or a mixture of these, whereby the gradient in mixing ratio between the ultrafine fibers (a) and (b) in the direction of thickness of the leather-like sheet material becomes smooth and the feel (sense of unity) shown by the leather-like sheet material when it is taken hold of becomes more improved.

From the viewpoint of the feel or touch of the leather-like sheet material, it is generally preferred that the amount of the web (Wc) be within the range of 5 to 50% by weight relative to the total amount of the web (Wa) and web (Wb). This range for the amount of the web (Wc) includes all specific values and subranges therebetween, such as 10%, 15%, 20%, 30%, 35%, 40% and 45% by weight. It is also preferred from the viewpoint of the feel or touch of the leather-like sheet material that the weight proportion between the recovered fibers and the ultrafine fiber-generating fibers (a') and/or (b') newly added on the basis of the whole fibers constituting the web (Wc) be within the range of 5/95 to 95/5. This range for the weight proportion between the recovered fibers and the ultrafine fiber-generating fibers includes all specific values and subranges therebetween, such as 10/90, 15/85, 20/80, 25/75, 30/70, 35/65, 40/60, 45/55, 55/45, 60/40, 65/35, 70/30, 75/25, 80/20, 85/15 and 90/10. As a matter of course, ultrafine fiber-generating fibers capable of giving ultrafine fibers intermediate in fineness between the ultrafine fibers (a) and ultrafine fibers (b) may be admixed in lieu of the ultrafine fiber-generating fibers (a') or (b') or may not be added. In cases where the substrate is sliced into two in the direction of thickness and thus used as two sheets, the laminated web may have the constitution 'web (Wa)/web (Wb)/web (Wa)' and, when the web (Wc) is inserted, the structure 'web (Wa)/web (Wc)/web (Wb)/web (Wc)/web (Wa)'. The proportion of the webs in the laminate after slicing may be the same as the proportion in the case of using the laminated web as single sheet of substrate.

The laminated web is then subjected to entanglement by needle punching. In the practice of the invention, however, needle punching is conducted so that needle barbs may not protrude above the surface of the web (Wa). Thus, in cases where the substrate is used as a single sheet without slicing prior to surface layer formation and the laminated web has the structure (Wa)/(Wb) or (Wa)/(Wc)/(Wb), the first barb of the needle used may protrude from the face side of (Wb) when needle punching is carried out from the face side of (Wa) but, when needle punching is effected from the face side of (Wb), the first barb of the needle used should not protrude from the face side of (Wa), hence, in other words, the depth of thrust is adjusted so that the first barb may stop within the web. If the barb protrude above the face side of the web (Wa), a number of ultrafine fibers (b) will get mixed on the surface of the substrate consisting of ultrafine fibers (a) and the peel strength will decrease accordingly. In cases where the laminated web has the constitution (Wa)/(Wb)/(Wa) or (Wa)/(Wc)/(Wb)/(Wc)/(Wa), for instance, so that it may be sliced to give two substrates at a time prior to surface layer formation, the depth of thrust is selected so that the first barb of the needle used may not protrude from the (Wa) face on the opposite side or, in other words, it may stop within the web, since both faces are (Wa) faces.

The number of punches in needle punching depends on the shape of the needle employed and the web thickness but, generally, it is selected within the range of 200 to 2,500 punches/cm². This range for the number of punches in needle punching includes all specific values and subranges therebetween, such as 400, 600, 800, 1,000, 1,200, 1,400, 1,600, 1,800, 2,000, 2,200 and 2,400 punches/cm². If the needle punching conditions are excessively severe, the incidence of fiber breakage will rather increase as compared with the fiber entangling effect, leading to decreases in tear strength and other physical properties. If the needle punching conditions are too weak, the peel strength and other properties will be deteriorated and the feel of substantiality will not be obtained due to the insufficiency of entanglement.

Then, the entangled nonwoven fabric is pressed in the direction of thickness according to need for improving the smoothness of the nonwoven fabric. For the pressing, the conventional methods, for example the method comprising passing the web between two heated rolls and the method comprising passing the web heated in advance between cooled rolls, can be utilized. In this case, the layer whose constituent fibers are lower in Young's modulus among the fibers constituting the entangled nonwoven fabric is more readily compressed and, therefore, as for the designing of the Young's modulus of the ultrafine fiber-generating fibers, a method is preferably carried out according to which the ultrafine fiber-generating fibers constituting that layer of the nonwoven fabric which is desired to have a higher apparent specific gravity in the nonwoven fabric, namely a higher ultrafine fiber specific gravity in the form of a fibrous substrate, is given a lower Young's modulus as compared with the other layer(s). When the island component polymer and sea component polymer constituting the ultrafine fiber-generating fibers are approximately identical in Young's modulus, those fibers having finer islands tend to be lower in Young's modulus as the ultrafine fiber-generating fibers and, generally, the Young's modulus of the ultrafine fiber-generating fibers (b') becomes lower in Young's modulus than the ultrafine fiber-generating fibers (a'). In the practice of the invention, it is of course possible to employ either such a design or select a design such that the ultrafine fiber-generating fibers (a') and (b') become approximately identical in Young's modulus according to the feel, appearance and other features required of the leather-like sheet material. When it is intended to improve the smoothness of the entangled nonwoven fabric, hence the smoothness of that side A of the leather-like sheet substrate on which the grain layer is formed, however, a design of making the Young's modulus of the ultrafine fiber-generating fibers (a') lower than the Young's modulus of the ultrafine fiber-generating fibers (b') is also preferably employed.

The thickness of the entangled nonwoven fabric or the nonwoven fabric derived therefrom by pressing in the direction of thickness can be selected arbitrarily according to the intended use of the leather-like sheet material to be obtained, hence is not particularly restricted. In the case of a single one, the thickness is preferably about 0.2 to 3.0 mm, more preferably about 0.4 to 2.5 mm. This range for the thickness of the entangled nonwoven fabric or the nonwoven fabric includes all specific values and subranges therebetween, such as 0.4, 0.6, 0.8, 1.0, 1.2, 1.4, 1.6, 1.8, 2.0, 2.2, 2.4, 2.6 and 2.8 mm.

Then, the entangled nonwoven fabric is impregnated with a polymer elastomer. The polymer elastomer is a resin conventionally used in the production of leather-like sheet materials and it includes polyurethane resins, polyvinyl chloride resins, polyvinyl butyral resins, polyacrylic resins, polyamino acid resins, silicone resins, and mixtures or copolymers of these. Among these resins, polymer elastomers whose main constituent is a polyurethane resin or resins are most preferably used since they can provide leather-like sheet materials with well balanced feel or touch and physical properties. Such a polymer elastomer is made into an aqueous emulsion or a solution in an organic solvent and, after impregnation of the entangled nonwoven fabric with the emulsion or solution, the elastomer is coagulated to give a substrate comprising the entangled nonwoven fabric and polymer elastomer.

All polyurethanes known in the art can be used as the polyurethane for impregnating the entangled nonwoven fabric. Thus, for example, there may be mentioned polyurethanes, obtained by reacting at least one polymer diol selected from among polyester diols, polyether diols, polycarbonate diols and like polymer diols having an average molecular weight (number average) of 500 to 3,000, with at least one diisocyanate selected from among aromatic, alicyclic and aliphatic diisocyanates, such as 4,4'-diphenylmethanediisocyanate, isophoronediisocyanate and hexamethylene diisocyanate, together with at least one low-molecular weight compound having two or more active hydrogen atoms and having a molecular weight of not more than 300, for example, at least one compound selected from among diols, such as ethylene glycol, propylene glycol, butanediol and 3-methyl-1,5-pentanediol, diamines, such as ethylenediamine, isophoronediamine, piperazine and phenylenediamine, and hydrazides, such as adipic hydrazide and isophthalic hydrazide, in a predetermined mole ratio. This range for the one polymer diol average molecular weight includes all specific values and subranges therebetween, such as 1,000, 1,500, 2,000 and 2,500. Where necessary, the polyurethane may be used in the form of a polymer composition prepared by adding thereto a synthetic rubber, a polyester elastomer and/or a like polymer.

These resins are used in the form of solutions, dispersions, or solution-dispersion mixtures. A coagulation modifier or heat-sensitive coagulant, foaming agent, another treatment agent(s), softening agent, flame retardant, and/or dye, pigment or like colorant, among others, may be added thereto. As the method of impregnating the fibrous assembly with the resin, there may be mentioned the method which comprises impregnating the fibrous assembly with the resin emulsion or solution by immersion, coating, or squeezing, for instance, and, after impregnation, coagulating the resin in a porous or nonporous state by the wet process or dry process or a combination of these processes.

The fibrous substrate after impregnation with and coagulation of the polymer elastomer is treated with an agent which is a nonsolvent to the ultrafine fibers and polymer elastomer and is a solvent or decomposing agent to the sea component when the ultrafine fiber-generating fibers are fibers having a sea-island structure to thereby generate ultrafine fibers (a) and ultrafine fibers (b), whereby a leather-like sheet substrate comprising an ultrafine fiber-based entangled nonwoven fabric and the polymer elastomer is obtained. It is of course possible to employ the method which comprises converting the ultrafine fiber-generating fibers to ultrafine fibers (a) and ultrafine fibers (b) prior to impregnation with the polymer elastomer.

The thickness of the leather-like sheet substrate can be selected arbitrarily, hence is not particularly restricted. Preferably, however, it is within the range of 0.3 to 4 mm, in particular 0.5 to 3.0 mm. This range for the thickness of the leather-like sheet substrate includes all specific values and subranges therebetween, such as 0.7, 0.9, 1.1, 1.3, 1.5, 1.7, 1.9, 2.1, 2.3, 2.5, 2.7 and 2.9 mm. The basis weight of the leatherlike sheet substrate is preferably within the range of 120 to 1,600 g/m$^2$, in particular 200 to 1,200 g/m$^2$, from the viewpoint of feel/touch and substantiality. This range for the basis weight of the leatherlike sheet substrate includes all specific values and subranges therebetween, such as 400, 600, 800, 1,000, 1,200 and 1,400 g/m$^2$. The weight ratio between the substrate-constituting fibers and polymer elastomer is 90:10 to 30:70, preferably 80:20 to 40:60. Outside this range, the balance between the fibers and elastomer becomes poor and the leather-like sheet product obtained may be unsturdy or may not have bulkiness (voluminousness).

Then, a grain layer is formed on the side A of the substrate. The resin to be used in forming the grain layer can be selected according to the intended use from among known polyurethane resins, such as polyester polyurethanes, polyether polyurethanes, polycarbonate polyurethanes, and mixtures of these, silicone-modified polyurethanes, fluorine-modified polyurethanes and other modified polyurethanes. Where necessary, an additive or additives, such as an antioxidant, or another colorant, such as a pigment, may be added at addition levels at which no significant adverse effects are produced in achieving the object of the invention. In particular, coloration with titanium oxide or a pigment is effective in masking dyeing specks possibly resulting from dyeing of the substrate layer. The level of addition of titanium oxide and of a pigment is preferably within the range of 1 to 200% by weight relative to the resin amount from the surface masking and flexibility viewpoint. This range for the level of addition of titanium oxide and of a pigment includes all specific values and subranges therebetween, such as 10%, 20%, 30%, 40%, 50%, 60%, 70%, 80%, 90%, 100%, 110%, 120%, 130%, 140%, 150%, 160%, 170%, 180% and 190% by weight.

The 100% modulus of the polyurethane resin for constituting the grain layer may be selected according to the intended use. From the viewpoint of feel, appearance and surface physical properties, it is preferably within the range of 30 to 100 kg/cm$^2$. This range for the 100% modulus of the polyurethane resin includes all specific values and subranges therebetween, such as 40, 50, 60, 70, 80 and 90 kg/cm$^2$. The thickness of the resin layer is preferably within the range of 10 to 300 µm for obtaining a natural leather-like feel and touch, although the thickness depends also on the 100% modulus of the resin. This range for the thickness of the resin layer includes all specific values and subranges therebetween, such as 30, 50, 70, 90, 110, 130, 150, 170, 190, 210, 230, 250, 270 and 290 µm. When it exceeds 300 µm, the feel of the leather-like sheet material as a whole tends to become hard or rigid and, when it is thinner than 10 µm, the surface physical properties tend to become inferior. Such tendencies are unfavorable to ordinary uses but may be tolerable to certain uses.

As the method of providing the grain layer-constituting polyurethane resin with a dye, there may be mentioned the method comprising providing the polyurethane with a dye and then forming the grain layer and the method comprising providing the grain layer with a dye after formation of the grain layer.

In the dyeing finishing of the grain layer, when the grain layer-constituting polyurethane is a readily dyeable one, the equilibrium dye take-up by the readily dyeable polyurethane is not less than 60 mg/g and this is favorable since the grain layer, when colored by the dye, acquires a natural leatherlike appearance of depth. More preferably, the equilibrium dye take-up is not less than 60 mg/g but not more than 500 mg/g, most preferably not less than 80 mg/g but not more than 300 mg/g. This range for the thickness of the equilibrium dye take-up includes all specific values and subranges therebetween, such as 100, 150, 200, 250, 300, 350, 400 and 450 mg/g.

As examples of the polyurethane showing an equilibrium dye take-up of not less than 60 mg/g, there may be mentioned those containing polyethylene glycol as a polymer diol soft segment and those having a tertiary amino group within the polyurethane molecule. As for the dye species usable in the above polyurethane dying, such known dyes as acid dyes, acid mordant dyes, metallic complex dyes, disperse dyes, sulfur dyes, vat dyes, basic dyes, and reactive dyes can be used, although the combination of a metallic complex dye or acid dye and a polyurethane showing an equilibrium dye take-up of not less than 60 mg/g against that dye is preferably employed.

As the method of overlaying the grain layer on the substrate, there may be mentioned, among others, the method of coating using a knife coater, a gravure coater or the like, the method comprising applying a solution or dispersion of a polyurethane resin or a molten polyurethane resin onto a release paper, causing the thus-formed resin film to adhere to the substrate and, after drying, peeling off the release paper, the method comprising applying a molten polyurethane resin onto the substrate and cooling the resin to solidify the same, the method comprising applying a polyurethane solution or dispersion or a molten polyurethane onto a release paper, forming the same into a film, for example, by drying, then peeling off the release paper and causing the thus-formed film to adhere to the substrate, the method comprising causing a nonwoven fabric to adhere to the substrate, and the method comprising causing a nonwoven fabric to adhere to the substrate layer and then forming the fabric into a film on a heating roll. From the viewpoint of surface uniformity and feel/touch, the method comprising causing a film or nonwoven fabric to adhere to the substrate surface is preferred and, more preferably, the method comprising forming a nonwoven fabric prepared by the melt blown technique into a film on a heating roll can be used.

The grain-forming polyurethane to be overlaid on the leather-like sheet includes polyurethanes obtained by reacting a polyester diol having an average molecular weight (number average) of 600 to 3,000, as obtained by reacting at least one diol selected from aliphatic diols or alicyclic diols containing 2 to 12 carbon atoms, for example, straight or branched aliphatic dials or alicyclic dials, such as ethylene glycol, propanediol, 1,4-butanediol, 1,5-pentanediol, 3-methyl-1,5-pentanediol, neopentyl glycol and 1,6-hexanediol, with at least one dicarboxylic acid, or an ester thereof, selected from among aliphatic dicarboxylic acids, such as succinic acid, glutaric acid and adipic acid, or esters of such dicarboxylic acids, among others, with an organic diisocyanate, whose main component is an aromatic or alicyclic diisocyanate, such as phenylene diisocyanate, tolylene diisocyanate or 4,4-diphenylmethanediisocyante, if necessary together with an organic diisocyanate, selected from among aliphatic diisocyanates or naphthalene ring-containing diisocyanates, together with a chain extender selected from among low-molecular weight compounds having two active hydrogen atoms, for example, dials, amino alcohols, hydrazines, diamines an the like. The range for the polyester dial average molecular weight includes all specific values and subranges therebetween, such as 1,000, 1,500, 2,000 and 2,500. As the method of reaction, there may be mentioned the method comprising selecting the polymer dial, organic diisocyanate and chain extender in a desired composition ratio and polymerizing them in the manner of melt polymerization, bulk polymerization or solution polymerization, for instance, to give a thermoplastic polyurethane. The polyurethane species to be used, is not limited to the polyester polyurethanes mentioned above, but a polyether polyurethane, a polycarbonate polyurethane or a copolymer or mixture of them may also appropriately be selected.

For obtaining a nonwoven fabric sheet comprising such a thermoplastic polyurethane and having good uniformity, the content of the polymer diol, which serves as a soft segment, in the polyurethane-producing composition is preferably adjusted to 45 to 75% by weight. This range for the content of the polymer diol includes all specific values and subranges therebetween, such as 50%, 55%, 60%, 65% and 70% by weight. It is preferred that the polyurethane be one produced by polymerization using a chain extender whose main component is, in particular, a compound selected from low-molecular aliphatic diols or isophoronediamine and the degree of polymerization be adjusted for the polyurethane to have an intrinsic viscosity [η] within the range of 0.5 to 1.5 dl/g. This range for the intrinsic viscosity includes all specific values and subranges therebetween, such as 0.6, 0.8, 1.0, 1.2 and 1.4 dl/g. When the content of the soft segment in the polyurethane is less than 45% by weight, the spinnability of the molten polymer and the possibility of making fibers ultrafine are good, but such content is unfavorable to the flexibility, stretchability, shape stability and surface smoothness, among other properties. On the other hand, a soft segment content exceeding 75% by weight is favorable from the flexibility viewpoint, but renders the spinnability and producibility of ultrafine fibers poor. When the intrinsic viscosity [η] of the polyurethane is lower than 0.5, the spinnability decreases: and it becomes difficult to produce ultrafine fibers. When the polyurethane has an intrinsic viscosity [η] higher than 1.5, the melt viscosity becomes high, and no good fiber flow can be formed. One or more additives, such as antiblocking agents, stabilizers, colorants, and antistatic agents may be added to the above polyurethane, each at an appropriate addition level.

Usable as the method of obtaining a nonwoven fabric using the above polyurethane composition are the nonwoven fabric producing methods known in the art, for example the method using the melt-blown, spun bond, papermaking, and water jet entanglement technique. The method using the melt-blown technique is preferably used, however. For obtaining the polyurethane nonwoven fabric by the melt-blown technique in the practice of the invention, the spinning temperature is selected within the range of 220 to 280° C. so that the polyurethane may show a melt viscosity of not more than 500 poises, and the rate of air jet is selected within the range of 5 to 25 Nm$^3$/minute per meter of width. When the air jet rate is less than 5 Nm$^3$/minute, the coverage of the melt-blown polyurethane laminate becomes small and, therefore, the formation of a satisfactory grain layer tends to become difficult. When it exceeds 25 Nm$^3$/minute, the coverage of the melt-blown polyurethane laminate becomes excessive and the balance in feel with the leather-like sheet is destroyed, hence the value of the product as a commodity decreases. As for the method of laying the polyurethane nonwoven fabric sheet obtained by the above-mentioned melt-blown method and the leather-like sheet one over the other, the method comprising bonding the polyurethane nonwoven fabric sheet to the side A of the substrate layer via an adhesive or the like, or the method comprising blowing the polyurethane nonwoven fabric sheet directly to the side A of the substrate layer may be employed.

The polyurethane nonwoven fabric sheet preferably has a weight within the range of 15 to 300 g/m$^2$. This range for the polyurethane nonwoven fabric sheet weight includes all specific values and subranges therebetween, such as 50, 100, 150, 200 and 250 g/m$^2$. When the weight is less than 15 g/m$^2$, it is impossible to obtain a grain face sufficient in surface smoothness and, in addition, the operation unfavorably becomes difficult to control. When it exceeds 300 g/m$^2$, the leather-like sheet becomes too heavy and acquires a rubber-like feel, hence the value of the product as a commercial product unfavorably tends to decrease. The bonding of the melt-blown polyurethane nonwoven fabric to the fibrous substrate may be carried out by any of the bonding methods known in the art, for example by the method comprising applying an adhesive solution in advance to the fibrous substrate using a gravure coater or by other coating method, laying the melt-blown nonwoven fabric thereon and bonding them together under pressure, the method comprising effecting adhesion using a hot melt, the method comprising effecting adhesion while melting the melt-blown nonwoven fabric, or the method comprising converting the melt-blown nonwoven fabric to a film by heating for melting and then causing the film to adhere to the substrate, without any particular restriction. The method comprising gravure coating the fibrous substrate with an adhesive solution, followed by bonding is preferred since the influence of the adhesive on the feel and touch can be minimized.

The melt-blown polyurethane nonwoven fabric applied in the above manner is then integrated with the substrate layer and shaped by heating and melting. As for the method of treatment, the polyurethane of the melt-blown nonwoven fabric is melted for integration by means of an embossing plate or embossing roll. When, in the step of integration, the heating/melting temperature and other conditions are adjusted so that the nonwoven fabric condition may partly remain, air permeability can be obtained. When the polyurethane is completely melted so that no nonwoven fabric condition may remain, high surface physical properties are obtained. The treatment conditions may be selected according to the final use. Further, coloration with a dye or pigment, staking and/or treatment with various known agents for providing such functions as water repellency, oil repellency, wear resistance and so forth may be carried out before or after embossing treatment. Prior to grain layer formation, the substrate may be subjected to pretreatment, for example coloration, slicing for dividing perpendicularly to the direction of thickness to obtain a plurality of sheets or for thickness adjustment, buffing for adjusting the substrate surface smoothness or for napping, and/or relaxation treatment for improving the feel and touch.

The leather-like sheet material obtained in accordance with the present invention can be used in all fields of application where leather-like sheet materials are generally used, for example in making clothes, interior goods, bags, shoes, gloves/mittens, miscellaneous goods and accessories, belts, children's satchels, baseball gloves, balls, etc.

It is particularly suited for use sports shoe, since it is excellent in peel strength and resistant to transverse stretching, hence the sports shoe can be used even under severe conditions.

EXAMPLES

The following examples illustrate the present invention more specifically. These examples are, however, by no means limitative of the scope of the present invention. In the examples, "part(s)" and "%" are on the weight basis, unless otherwise specified.

The decitex value of ultrafine fibers was calculated as follows:

$$\text{Fiber decitex} = D \times (R/2)^2 \times n \times 10^6$$

where R is the mean diameter (cm) of ultrafine fibers in ultrafine fiber bundles (mean value obtained by photographing a section of the substrate using a scanning electron microscope, selecting 10 ultrafine fiber bundles at random, selecting 20 arbitrary ultrafine fibers evenly from among ultrafine fibers in each ultrafine fiber bundle section, and measuring the diameters thereof), and D is the specific gravity of the ultrafine fiber-constituting polymer.

Tenacity and Elongation

Measurements were made according to JIS L 1096.

Peel Strength

Test specimens (leather sheet material): 2.5 cm in width, 23 cm in length (longitudinal);

Adherend plate: polyurethane type rubber plate, 3.0 cm in width, 5.0 cm in length, 5.0 mm in thickness;

Adhesive: two-pack type polyurethane-based adhesive;

Preparation of test specimens: The adhesive is applied to the test specimen and to the adherend plate and, after predrying, the specimen and adherend are laid on each other, and the whole is pressed and cured at 25° C. for 24 hours and then subjected to measurement.

Testing apparatus: Shimadzu autograph, rate of pulling 100 mm/min, chart speed 50 mm/min;

Judgment: The first maximum peak and minimum peak are excluded, 5 largest values (Ma 1, Ma 2, Ma 3, Ma 4, Ma 5) are selected from among the maximum peaks and 5 smallest values (Mi 1, Mi 2, Mi 3, Mi 4, Mi 5) from among the minimum values, and the mean of the 10 values is calculated.

Peel strength (kg/2.5 cm)=(Ma 1+Ma 2+Ma 3+Ma 4+Ma 5+Mi 1+Mi 2+Mi 3+Mi4+Mi5)/10.

Feel and Touch

Arbitrarily chosen 20 panelists engaged in the manufacture and sale of artificial leathers grasped the leather-like sheet material by the hand and evaluated it according to the criteria given below. The evaluation score given by the largest number of panelists was reported.

Evaluation Criteria

5: There is a feel of substantiality, the feel of inclination is balanced, and the feel is natural leather-like and good.

4: The feel of inclination is less balanced as compared with 5, but there is a feel of substantiality, and the feel is natural leather-like and good.

3: The feel of inclination is still less balanced as compared with 4 but there is a feel of substantiality.

2: There is a feel of substantiality but there is no feel of inclination.

1: There is neither feel of substantiality nor feel of inclination, and the feel is far from that of natural leathers.

Example 1

A 50-island sea-island type composite spinning apparatus for melting two polymers differing in melt flow characteristics in individual melting systems, forming a mixed system composed of both by repeating joining and parting, and carrying out spinning was used. The apparatus was charged with 35 parts of polyethylene on the sea component side and 65 parts of 6-nylon on the island component side, and spinning was carried out to give ultrafine fiber-generating filaments (a') having a fineness of 10 decitex. The filaments were 2.5-fold stretched and, after crimping, cut to a fiber length of 51 mm. The fibers obtained were opened on a card and then formed into a web (Wa1) with a basis weight of 370 g/m$^2$ using a cross-lapper webber. Separately, 50 parts of polyethylene as the sea component and 50 parts of 6-nylon as the island component were melt-spun in the same melting system to give ultrafine fiber-generating filaments (b') having a mean number of islands of about 4,000 and a single filament fineness of 10 decitex. These filaments were 3.0-fold stretched and, after crimping, cut to a fiber length of 51 mm. The thus-obtained fibers were opened on a card and formed into a web (Wb1) having a basis weight of 370 g/m$^2$ using a cross-lapper webber. The two webs (Wa1) and (Wb1) were laid one on the other, and the resulting (Wa1)/(Wb1) type laminated web having a total basis weight of 740 g/m$^2$ was subjected to entangling treatment by needle punching. The needles used had the first barb at a position 5 mm from the tip, the depth of thrust from the web (Wa1) side was 8 mm, and the depth of thrust from the web (Wb1) side was 4.5 mm. Thus, under conditions such that the outer surface of the web (Wa1) was substantially free of ultrafine fiber-generating fibers (b'), punching treatment was performed at a density of 600 punches/cm$^2$ for each face side, hence a total of 1,200 punches/cm$^2$. This nonwoven fabric was then heated in a drier at 120° C. and pressed between two rolls while the polyethylene was in a softened state, whereby the thickness was adjusted to 2.2 mm.

This nonwoven fabric was impregnated with a solution composed of 17.5 parts of a polyurethane composition mainly comprising a polyester-based polyurethane and 82.5 parts of dimethylformamide (hereinafter sometimes referred to as DMF for short) and, after coagulation and washing with water, the polyethylene in the composite fibers was removed by extraction to thereby convert the ultrafine fiber-generating fibers (a') and (b') to ultrafine fibers, whereby a fibrous substrate composed of ultrafine 6-nylon fiber bundle-like fibers and the polyurethane and having a thickness of 1.6 mm and a basis weight of 590 g/m$^2$ was obtained. The ultrafine fibers (a) on the side A (the face constituted of ultrafine fibers (a)) of the fibrous substrate obtained had a fineness of 0.07 decitex, and the ultrafine fibers (b) on the side B (the face substantially constituted of ultrafine fibers (b)) had a mean fineness of 0.0005 decitex. The thickness of this substrate was adjusted to 1.5 mm by buffing the side mainly composed of ultrafine fibers (b) and, then, the side composed of ultrafine fibers (a) was treated on an emery buffing machine to form a smooth surface, whereby a fibrous sheet (BM-1) was obtained. Observation of the side A under an electron microscope revealed that the side was substantially composed of ultrafine fibers (a) alone and almost no ultrafine fibers (b) were found. Further, upon observation of the side B, a condition of mixed occurrence of ultrafine fibers (b) and ultrafine fibers (a) was observed.

Then, a polyurethane was prepared by the melt polymerization method by charging poly-3-methyl-1,5-pentyl adipate glycol with an average molecular weight of 1,150, polyethylene glycol with an average molecular weight of 2,000, 4,4'-diphenylmethanediisocyanate and 1,4-butanediol in a mole ratio of 0.9:0.1:4:3 (the theoretical nitrogen content based on the isocyanato group being 4.63%) and using a screw type kneader polymerizer. This polyurethane, had a softening point of 125° C. The polyurethane obtained in a molten state was transferred, by the melt-blown method, in the fibrous molten form from slots on the both side of a die orifice heated at a temperature of 260° C. by means of a high-velocity air stream heated at a temperature of 260° C.

onto a wire net moving at a velocity of 2 m/minute and the thus-formed fine fibers were collected on the wire net at a distance of collection of 40 cm. The thus-collected web was a random web composed of fine fibers. Thus was obtained a melt-blown polyurethane nonwoven fabric (MB-1) having a mean basis weight of 45 g/m², a mean thickness of 1.8 mm and an apparent density of 0.25 g/cm³. The equilibrium dye take-up by this nonwoven fabric was 180 mg/g for the Irgalan Red 2GL mentioned below.

The dyeing conditions were as follows:
Dyeing Conditions
Dye Metallic complex dye Irgalan Red 2GL (product of Ciba Specialty Chemicals, Inc.)
Dyeing assistant Levelan NKD 2 g/l (product of Marubishi Oil Chemical Co.,Ltd)
Bath ratio 1:100
Dyeing temperature, time 90° C., 60 minutes.

Then, the polyurethane solution in DMF was applied to the A side of the fibrous sheet (BM-1) using a gravure roll and, immediately thereafter, the above-mentioned melt-blown polyurethane nonwoven fabric was laid on the sheet and temporarily fixed onto the fibrous sheet by pressing using a press roll.

Thereafter, the nonwoven fabric side was melted and embossed using an embossing roll heated to a surface temperature of 155° C. under a press pressure of 4 kg /cm² while simultaneously achieving integration by melting. A grained raw leather-like sheet having a surface layer thickness of 40 µm was obtained. The core of this raw sheet was dyed red with an acid dye (Kayanol Milling Red BW (product of Nippon Kayaku Co., Ltd.) at a dye concentration of 2% OWF using a "Taiko" dyeing apparatus.

The surface grain layer was then colored using a metallic complex dye (Irgalan Red 2GL), whereby a red-dyed leather-like sheet was obtained. After drying, this raw sheet was sprayed with spray inks having the compositions specified below, and then subjected to calendaring and then to staking (stretch and flex) treatment (60° C.×60 minutes) in a tumbler drier to give a red grained leather-like sheet material.
Spraying Conditions
'Topcoat'
C-34 (silicone-modified polycarbonate ether urethane (product of Dainippon Ink and Chemicals, Inc.)) 50 parts
M-54 (matting agent (product of Dainippon Ink and Chemicals, Inc.)) 40 parts
X-3050 (red pigment (product of Dainippon Ink and Chemicals, Inc.)) 18 parts
H-1 (crosslinking agent (product of Dainippon Ink and Chemicals, Inc.) 3 part
Thinner 350 parts
Coating build-up 95 g/m²
'Middle coat'
C-34 (silicone-modified polycarbonate ether urethane (product of Dainippon Ink and Chemicals, Inc.)) 120 parts
M-54 (matting agent (product of Dainippon Ink and Chemicals, Inc.)) 80 parts
X-3050 (red pigment (product of Dainippon Ink and Chemicals, Inc.)) 100 parts
Thinner 350 parts
Coating build-up 190 g/m²
'Base coat'
C-3 (polycarbonate urethane (product of Dainippon Ink and Chemicals, Inc.)) 100 parts
H-1 (crosslinking agent (product of Dainippon Ink and Chemicals, Inc.) 3 parts
Thinner 400 parts
Coating build-up 95 g/m²

The leather-like sheet material obtained had a feel of inclination in the direction of thickness, was soft and hardly stretchable transversely and was high in peel strength, namely it was a leather-like sheet material having a natural leather-like feel. Using the leather-like sheet material, basket shoes were made. They were soft, hardly lost their shape through long term and were excellent in peel strength.

Example 2

In the production of the 1.6-mm-thick fibrous substrate in Example 1, a blue pigment was added to the polyurethane solution for impregnation of the nonwoven fabric to a pigment concentration of 0.5% relative to the polyurethane resin. A blue fibrous substrate was thus obtained. The face mainly composed of ultrafine fibers (b) of this substrate was buffed to thereby adjust the thickness to 1.5 mm and then the substrate was subjected to relax treatment using a circular, followed by drying, impregnation with a softening agent and drying to give a soft blue fibrous substrate. This fibrous substrate was provided with a dry surface layer on the side composed of ultrafine fibers (a) under the following conditions.
Dry release paper DE-123
Dry surface layer forming resin compositions
'Surface skin layer'
NY-214 (silicone-modified polyether polyurethane (product of Dainippon Ink and Chemicals, Inc)) 100 parts
DUT-4790 (black pigment (product of Dainichiseika Color & Chemicals Mfg. Co., Ltd.)) 30 parts
DMF 35 parts
Wet coating build-up 120 g/m²
'Adhesive layer'
UD-8310 (polyether polyurethane (product of Dainichiseika Color & Chemicals Mfg. Co., Ltd.)) 100 parts
D-110N (crosslinking agent (product of Takeda Chemical Industries, Ltd.)) 10 parts
QS (crosslinking agent (product of Takeda Chemical Industries, Ltd.)) 1.5 parts
DMF 10 parts
Ethyl acetate 20 parts
Wet coating build-up 150 g/m²

After dry surface layer formation, the sheet was cured at 60° C. for 48 hours, the release paper was peeled off, followed by stretch and flex treatment, whereby a black grained leather-like sheet material having a grain layer thickness of 50 µm was obtained. The leather-like sheet material obtained had a feel of inclination in the direction of thickness, was soft and hardly stretchable transversely and was high in peel strength, namely it was a leather-like sheet material having a natural leather-like feel. Using the leather-like sheet material, soccer shoes were made. They were soft, hardly lost their shape through long term and were excellent in peel strength.

Example 3

The face mainly composed of ultrafine fibers (b) of the blue fibrous substrate used in Example 2 was buffed to thereby adjust the thickness to 1.5 mm. Then, separately, the procedure for producing the melt-blown polyurethane nonwoven fabric in Example 1 was followed in the same manner as in Example 1 except that titanium oxide was added in an amount of 3% relative to the polyurethane, to give a white polyurethane nonwoven fabric (MB-2) having a mean basis weight of 45 g/m², a mean thickness of 1.8 mm and an apparent density of 0.25 g/cm³. The polyurethane solution in DMF was applied to the ultrafine fiber (a) side of the fibrous substrate of Example 1 using a gravure roll and, immediately thereafter, the polyurethane nonwoven fabric (MB-2) was laid thereon, and temporarily fixed onto the fibrous sheet by pressing using a press roll. Thereafter, the nonwoven fabric side was melted and embossed using an embossing roll heated to a surface temperature of 155° C. under a press pressure of 4 kg/ cm² for simultaneous integration by melting to give a grained raw leather-like sheet with a surface layer thickness of 43 µm was obtained. Using a "Taiko" dyeing apparatus, this raw sheet was subjected to relax treatment and then dried at 70° C. in a tumbler drier. Thereafter, spray finishing was performed using white pigment-containing polyurethane resins having the compositions shown below and, after calendaring, milling treatment was carried out in a tumbler drier.

Spraying Conditions

'Topcoat'

C-34 (silicone-modified polycarbonate ether urethane (product of Dainippon Ink and Chemicals, Inc.)) 50 parts M-54 (matting agent (product of Dainippon Ink and Chemicals, Inc.)) 40 parts X-3054 (white pigment (product of Dainippon Ink and Chemicals, Inc.)) 11 parts X-3046 (blue white pigment (product of Dainippon Ink and Chemicals, Inc.)) 7 parts H-1 (crosslinking agent (product of Dainippon Ink and Chemicals, Inc.) 3 part Thinner 350 parts Coating build-up 95 g/m²

'Middle coat'

C-34 (silicone-modified polycarbonate ether urethane (product of Dainippon Ink and Chemicals, Inc.)) 120 parts M-54 (matting agent (product of Dainippon Ink and Chemicals, Inc.)) 80 parts X-3054 (white pigment (product of Dainippon Ink and Chemicals, Inc.)) 60 parts X-3050 (blue white pigment (product of Dainippon Ink and Chemicals, Inc.)) 40 parts Thinner 350 parts Coating build-up 190 g/m²

'Base coat'

C-3 (polycarbonate urethane (product of Dainippon Ink and Chemicals, Inc.)) 100 parts H-1 (crosslinking agent (product of Dainippon Ink and Chemicals, Inc.)) 3 parts Thinner 400 parts Coating build-up 95 g/m²

The leather-like sheet material obtained was white, had a feel of inclination in the direction of thickness, was soft and hardly stretchable transversely and was high in peel strength, namely it was a leather-like sheet material having a natural leather-like feel. Using the leather-like sheet material, tennis shoes were made. They were soft, hardly lost their shape through long term and were excellent in peel strength.

Example 4

A web (Wa4) composed of the 50-island ultrafine fiber-generating fibers (a') used in Example 1 and having a weight of 295 g/m² and a web (Wb4) composed of the ultrafine fiber-generating fibers (b') with a mean number of islands of 4,000 as used in Example 1 and having a weight of 295 g/m² were prepared and these webs are layered one on the other in the order of (Wa4)/(Wb4)/(Wb4)/(Wa4). The needles used had the first barb at a position 5 mm from the tip, the depth of thrust was 4.5 mm. Thus, under conditions such that the outer surface of the web (Wa4) was substantially free of ultrafine fibergenerating fibers (b'), punching treatment was performed at a density of 600 punches /cm² for each face side, hence a total of 1,200 punches /cm². This nonwoven fabric was then heated in a drier at 120° C. and pressed between two rolls while the polyethylene was in a softened state, whereby a nonwoven fabric having a weight of 1,132 g/m² and a thickness of 3.53 mm was obtained. Then, the nonwoven fabric was impregnated in the same manner as in Example 1 with a solution composed of 17.5 parts of a polyurethane composition mainly comprising a polyester-based polyurethane and 82.5 parts of dimethylformamide and, after coagulation and washing with water, the polyethylene in the composite fibers was removed by extraction, whereby a fibrous substrate composed of ultrafine 6-nylon fiber bundle-like fibers and the polyurethane and having a thickness of 2.7 mm and a weight of 1,026 g/m² was obtained.

The fibrous substrate obtained was divided into two pieces in the direction of thickness using a slicer to give two 1.35-mm-thick fibrous substrates. Each face resulting from division was abraded using a sand paper, whereby two 1.25mm-thick fibrous substrates were obtained. Upon observation of the face resulting from slicing and the opposite face (ultrafine fibers (a)) of each fibrous substrate under a scanning electron microscope for the condition of fiber entanglement, the face resulting from slicing was found to be in a condition such that 50-island ultrafine fibers (a) were intermingled with ultrafine fibers (b) (the mean number of islands being 4,000) . On the other hand, the opposite face was in a condition such that 50-island ultrafine fibers (a) alone were in an entangled state. The melt-blown polyurethane nonwoven fabric was caused to adhere to the 50-island ultrafine fiber (a) side of this fibrous substrate in the same manner as in Example 1, followed by the same embossing, core dyeing, dyeing, drying, spraying and milling treatments to give a red leather-like sheet material having a thickness of 1.3 mm.

The leather-like sheet material obtained had a feel of inclination in the direction of thickness, was soft and hardly stretchable transversely and was high in peel strength, namely it was a leather-like sheet material having a natural leather-like feel. Using the leather-like sheet material, basket shoe were made. They were soft, hardly lost their shape through long term and were excellent in peel strength.

Comparative Example 1

Two sheets of the 50-island web (Wa1) produced in Example 1 were layered to give a web having a weight of 740 g/m². Using this web, the step of needle punching and the subsequent steps were carried out in the same manner as in Example 1 to give a 1.6-mm-thick fibrous substrate comprising an entangled nonwoven fabric composed of about 50-island bundle fiber units and the polyurethane. One side of this substrate was buffed for thickness adjustment to give a 1.5-mm-thick substrate fabric. Then, surface layer formation was carried out in the same manner as in Example 2 on the face opposite to the buffed face using the melt-blown polyurethane nonwoven fabric. The thus-obtained red grained leather-like sheet material was soft and high in grain layer peel strength but was readily stretchable in the transverse direction.

Comparative Example 2

Two sheets of the web (Wb1) produced in Example 1 from fibers with a mean number of islands of about 4,000 were laid one on the other to give a web having a basis weight of 740 g/m². The needle punching and subsequent steps were carried out under the same conditions as in Example 1 to give a 1.6-mm-thick fibrous substrate comprising an entangled body composed of fiber bundles each comprising 4,000 fibers on an average and the polyurethane.

One side of this substrate was buffed to give a 1.5 mm-thick substrate fabric. Then, surface layer formation was carried out in the same manner as in Example 2 on the face opposite to the buffed face using the melt-blown polyurethane nonwoven fabric. The thus-obtained red grained leather-like sheet material was soft and resistant to transverse stretching but was low in grain layer peel strength.

Comparative Example 3

The blue fibrous substrate used in Example 2 was used. The face mainly composed of ultrafine fibers (a), opposite to the face treated in Example 2, was buffed to adjust the thickness to 1.5 mm. Surface layer formation was carried out on the ultrafine fiber (b) face opposite to the buffed face of this fibrous substrate by layering the titanium oxide-added white melt-blown nonwoven fabric in the same manner as in Example 3. The leather-like sheet material obtained was white, had a feel of inclination in the direction of thickness and was soft and resistant to transverse stretching, hence was a leather-like sheet material having a natural leather-like feel, but was low in peel strength.

The evaluation results obtained in Examples 1 to 4 and Comparative Examples 1 to 3 are summarized in Table 1. The judgments were made by the methods mentioned above.

to transverse stretching and has high peel strength, hence has a natural leather-like feel and touch, can be produced when the ultrafine fibers (a) constituting the side A of the substrate layer are made to have a mean fineness substantially within the range of 0.01 to 0.5 decitex and the ultrafine fibers (b) substantially constituting the other side (side B) opposite to the side A of the substrate layer are made to have a mean fineness of not more than ½ of the mean fineness of the ultrafine fibers (a).

Using the leather-like sheet material, shoe are made. They are soft, natural leather-like feelings, hardly lost their shape through long term and are excellent in peel strength.

Each document, patent application or patent publication cited by or referred to in this disclosure is incorporated by reference in its entirety. Any patent document to which this application claims priority is also incorporated by reference in its entirety. Specifically, priority documents JP 200318/2001, filed Jul. 2, 2001 is hereby incorporated by reference.

What is claimed is:

1. A leather-like sheet material comprising:
   a substrate layer comprising an entangled nonwoven fabric comprising ultrafine fibers and an elastic polymer or elastomer filled therein, and
   wherein one side (side A) of the substrate layer is overlayed with a grain layer comprising an elastomer mainly consisting of a polyurethane, and
   wherein the side A of the substrate layer comprises ultrafine fibers (a) having a mean fineness substantially within the range of 0.01 to 0.5 decitex, and
   wherein the other side (side B), opposite to side A of the substrate layer, comprises ultrafine fibers (b) having a

TABLE 1

| | Unit | Example 1 | Example 2 | Example 3 | Example 4 | Compar. Ex. 1 | Compar. Ex. 2 | Compar. Ex. 3 |
|---|---|---|---|---|---|---|---|---|
| Fiber constitution of fibrous substrate | | Double layer | Double layer | Double layer | Double layer | Single layer | Single layer | Double layer |
| Color | | Red | Black | White | Red | Red | Red | Red |
| Thickness | Mm | 1.50 | 1.49 | 1.47 | 1.30 | 1.48 | 1.47 | 1.48 |
| Weight | g/m² | 660 | 664 | 647 | 605 | 663 | 658 | 653 |
| Specific gravity | g/cm³ | 0.44 | 0.45 | 0.44 | 0.46 | 0.45 | 0.45 | 0.44 |
| Tenacity | | | | | | | | |
| (longitudinal) | Kg/25 mm | 68 | 68 | 63 | 54 | 71 | 60 | 64 |
| (transverse) | | 68 | 57 | 68 | 69 | 76 | 61 | 68 |
| Elongation | | | | | | | | |
| (longitudinal) | % | 115 | 104 | 104 | 107 | 130 | 105 | 108 |
| (transverse) | | 150 | 180 | 144 | 133 | 180 | 128 | 144 |
| 20% (transverse) tenacity | Kg/25 mm | 4.1 | 2.9 | 4.2 | 3.9 | 1.5 | 4.9 | 4.2 |
| Peel (longitudinal) strength | | 11.2 | 11.8 | 11.6 | 10.3 | 10.9 | 5.2 | 5.5 |
| Feel/touch | | 5 | 4 | 5 | 5 | 1 | 3 | 5 |
| Transverse | | Slight | Slight | Slight | Slight | Significant | Slight | Slight |

Effects of the Invention

A leather-like sheet material comprising a substrate layer composed of an entangled nonwoven fabric consisting of ultrafine fibers and an elastic polymer or elastomer filled therein and having, on one side (side A) of the substrate layer, a grain layer comprising an elastomer mainly consisting of a polyurethane which material gives a sense of inclination in the direction of thickness, is soft and resistant mean fineness of not more than ½ of the mean fineness of the ultrafine fibers (a).

2. The leather-like sheet material as claimed in claim 1, wherein the grain layer is colored by a combination of a readily dyeable polyurethane and a dye, and which combination attains an equilibrium dye take-up of not less than 60 mg/g.

3. The leather-like sheet material as claimed in claim 1, wherein the grain layer is colored with titanium oxide or a pigment.

4. The leather-like sheet material as claimed in claim 1, wherein the grain layer comprises a nonwoven fabric.

5. The leather-like sheet material as claimed in claim 1, wherein the side B of the substrate layer contains ultrafine fibers (a) mixed therein, but the side A is substantially free of ultrafine fibers (b).

6. The leather-like sheet material as claimed in claim 1, wherein the ratio in mean fineness between the ultrafine fibers (a) and the ultrafine fibers (b), (b)/(a), is $1/5$ to $1/1,000$.

7. The leather-like sheet material as claimed in claim 1, wherein the weight ratio of the substrate fibers and the elastic polymer or elastomer is within the range of 90:10 to 30:70.

8. A sports shoe comprising the leather-like sheet material as claimed in claim 1.

9. The leather-like sheet material as claimed in claim 1, wherein said ultrafine fibers comprise multi-component fibers.

10. The leather-like sheet material as claimed in claim 9, wherein said multi-component fibers consist of at least two spinnable polymer species.

11. The leather-like sheet material as claimed in claim 9, wherein said multi-component fibers are ultrafine fiber-generating fibers.

12. The leather-like sheet material as claimed in claim 11, wherein said ultrafine fiber-generating fibers are sea-island fibers comprising a sea component and an island component.

13. The leather-like sheet material as claimed in claim 12, wherein said island component comprises at least one polymer selected from the group consisting of a melt-spinnable polymer, a spinnable polyester and a polyolefin.

14. The leather-like sheet material as claimed in claim 13, wherein said melt-spinnable polymer is selected from the group consisting of nylon 6, nylon 66, nylon 610, nylon 12, and other spinnable polyamides.

15. The leather-like sheet material as claimed in claim 13, wherein said spinnable polyester is selected from the group consisting of polyethylene terephthalate, polybutylene terephthalate, other aliphatic polyester, and copolymers thereof.

16. The leather-like sheet material as claimed in claim 13, wherein said polyolefin is selected from the group consisting of polyethylene, polypropylene and polybutylene.

17. The leather-like sheet material as claimed in claim 12, wherein said sea component comprises at least one polymer which differs from the island component in solubility in a solvent, or in decomposability by a decomposing agent, and which shows under spinning conditions, a melt viscosity lower than the melt viscosity of the island component, or a lower surface tension as compared with the island component.

18. The leather-like sheet material as claimed in claim 12, wherein said sea component is selected from the group consisting of polyethylene, polypropylene, polystyrene, ethylene-propylene copolymers, ethylene-vinyl acetate copolymers, styrene-ethylene copolymers, and styrene-acrylic copolymers.

19. The leather-like sheet material as claimed in claim 1, wherein said entangled nonwoven fabric has a thickness of from 0.2 to 3.0 mm.

20. The leather-like sheet material as claimed in claim 1, wherein said leather-like sheet material has a thickness of from 0.3 to 4.0 mm.

21. The leather-like sheet material as claimed in claim 1, wherein the grain layer comprises a nonwoven fabric as bonded by the action of heat and pressure.

22. The leather-like sheet material as claimed in claim 1, wherein the grain layer has a thickness from 10 to 300 $\mu$m.

23. The leather-like sheet material as claimed in claim 1, wherein the polyurethane has a 100% modulus from 30 to 100 kg/cm$^2$.

24. The leather-like sheet material as claimed in claim 1, wherein the polyurethane is selected from polyester polyurethanes, polyether polyurethanes, polycarbonate polyurethanes, or mixtures thereof.

25. The leather-like sheet material as claimed in claim 1, wherein the polyurethane is selected from silicon-modified polyurethanes, fluorine-modified polyurethanes or other modified polyurethanes.

* * * * *